(12) United States Patent
Suenaga et al.

(10) Patent No.: US 7,833,467 B2
(45) Date of Patent: Nov. 16, 2010

(54) POLYESTER CONTAINER HAVING EXCELLENT HEAT RESISTANCE AND SHOCK RESISTANCE AND METHOD OF PRODUCING THE SAME

(75) Inventors: Ryo Suenaga, Yokohama (JP); Tsutomu Iwasaki, Yokohama (JP); Taku Hosokai, Yokohama (JP); Toshiki Sakaguchi, Yokohama (JP); Hisao Iwamoto, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 105 days.

(21) Appl. No.: 11/658,508

(22) PCT Filed: Jul. 25, 2005

(86) PCT No.: PCT/JP2005/013991

§ 371 (c)(1),
(2), (4) Date: Mar. 9, 2007

(87) PCT Pub. No.: WO2006/011612

PCT Pub. Date: Feb. 2, 2006

(65) Prior Publication Data

US 2007/0290415 A1    Dec. 20, 2007

(30) Foreign Application Priority Data

Jul. 27, 2004  (JP) .............................. 2004-219216
Jul. 29, 2004  (JP) .............................. 2004-221703

(51) Int. Cl.
*B29C 49/18* (2006.01)
*B29C 49/64* (2006.01)

(52) U.S. Cl. ................ 264/521; 264/530; 264/906; 425/526; 425/525; 164/34; 220/319; 428/35.7; 428/34.9

(58) Field of Classification Search ................. 425/525, 425/526; 164/34; 220/318; 428/35.7, 34.9; 264/521, 530, 906

See application file for complete search history.

(56) References Cited

U.S. PATENT DOCUMENTS

| | | | | |
|---|---|---|---|---|
| 4,929,168 A | * | 5/1990 | Jakobsen et al. | 425/384 |
| 5,281,387 A | * | 1/1994 | Collette et al. | 264/521 |
| 5,290,506 A | * | 3/1994 | Yokobayashi | 264/520 |
| 5,520,877 A | * | 5/1996 | Collette et al. | 264/521 |
| 5,840,350 A | * | 11/1998 | Salemi | 425/533 |
| 5,902,539 A | * | 5/1999 | Schmidt et al. | 264/513 |
| 5,989,661 A | * | 11/1999 | Krishnakumar et al. | 428/35.7 |

(Continued)

FOREIGN PATENT DOCUMENTS

EP    0 511 617 A1    11/1992

(Continued)

*Primary Examiner*—Patricia L Nordmeyer
*Assistant Examiner*—Michael B Nelson
(74) *Attorney, Agent, or Firm*—Sughrue Mion, PLLC

(57) ABSTRACT

A polyester container obtained by stretch-forming a preform of a thermoplastic polyester resin formed by injection forming wherein the central portion of the bottom wall is the remaining part of the gate at the time of injection forming, and is formed relatively thicker than the bottom wall surrounding the central portion, and the central portion of the bottom wall is substantially amorphous, and the bottom wall surrounding the central portion is oriented and crystallized. The container exhibits excellent heat resistance and shock resistance despite a thick portion that is the remaining portion of the injection gate is formed at the center of the bottom portion.

12 Claims, 5 Drawing Sheets

U.S. PATENT DOCUMENTS 6,749,415 B2 * 6/2004 Boyd et al. .................. 425/143

FOREIGN PATENT DOCUMENTS

| | | | |
|---|---|---|---|
| GB | 1 395 026 | A | 5/1975 |
| GB | 1395026 | * | 5/1975 |
| GB | 2 137 553 | A | 10/1984 |
| JP | 50-47778 | A | 4/1975 |
| JP | 50-156439 | U | 12/1975 |
| JP | 53-81570 | A | 7/1978 |
| JP | 57-24219 | A | 2/1982 |
| JP | 4-144731 | A | 5/1992 |
| JP | 5-131528 | A | 5/1993 |
| JP | 5-246416 | A | 9/1993 |
| JP | 6-134850 | A | 5/1994 |
| JP | 7-309320 | A | 11/1995 |
| JP | 8-318923 | A | 12/1996 |
| JP | 11-42696 | A | 2/1999 |
| JP | 2003-159743 | A | 6/2003 |

* cited by examiner ance, the obtained container has a problem of poor heat resistance in addition to the formation of the thick portion. According to the method of the patent document 2, too, the obtained container has poor heat resistance. Besides, to remove the thick portion, the center of bottom of the preform must be held between the preforming plug and the bottom-holding plug with a very large pressure to push and crush the thick portion arousing a problem in that the apparatus is placed under severe conditions such as exerting a large load on the apparatus.

POLYESTER CONTAINER HAVING EXCELLENT HEAT RESISTANCE AND SHOCK RESISTANCE AND METHOD OF PRODUCING THE SAME

TECHNICAL FIELD

The present invention relates to a polyester container and a method of its production. More particularly, the invention relates to a thermoplastic resin container having excellent heat resistance and shock resistance obtained by stretch-forming a preform that is formed by injection forming, and to a method of its production.

BACKGROUND ART

As is well known, polyester containers as represented by polyethylene terephthalate (PET) containers have been used in a variety of applications and, most widely, for foods and beverages. Further, cup-like containers having a wide mouth and a flange along the circumferential edge of the mouth have been placed in practical use as thermoplastic resin containers for foods and beverages.

As a method of producing the cup-like containers, a patent document 1 teaches a method of producing a cup-like container by forming a sheet-like preform by injection forming and by subjecting the preform to the heat forming such as plug-assisted forming.

According to the above method of forming the preform by injection forming and heat-forming the preform, a problem remains in that a central portion of the bottom of the container is formed thick due to the remaining portion of the injection gate, and breakage easily occurs due to the thick portion. A patent document 2 proposes a production method which avoids the formation of a thick portion. Concretely speaking, the patent document 2 teaches a plug-assisted forming method in which a portion corresponding to the center of the bottom of the preform of which the peripheral edge is fixed is held between a preforming plug and a bottom-holding plug, and the preforming plug is extruded in this state to form the preform.

Patent document 1: JP-A-5-69478
Patent document 2: JP-A-6-134850

DISCLOSURE OF THE INVENTION

According to the method of the patent document 1, however, the obtained container has a problem of poor heat resistance in addition to the formation of the thick portion. According to the method of the patent document 2, too, the obtained container has poor heat resistance. Besides, to remove the thick portion, the center of bottom of the preform must be held between the preforming plug and the bottom-holding plug with a very large pressure to push and crush the thick portion arousing a problem in that the apparatus is placed under severe conditions such as exerting a large load on the apparatus.

The applicant has previously proposed a method of producing a cup-like container by blow-forming and stretching the preform followed by heat-setting by heating, shrinking the preform back to impart the shape of a final container, and cooling the container (JP-A-2004-291621). According to this method, the heat-setting is effected and, therefore, a container having excellent heat resistance is obtained. Even relying upon the above method, if the preform formed by injection forming is used, the center of the bottom of the container is formed thick due to the remaining portion of the gate, and a satisfactory heat resistance is not obtained. That is, spherulites are formed by heat-setting in the thick portion at the center of bottom of the container. Therefore, though the heat resistance is improved, the shock resistance decreases. Further, formation of spherulites causes the center only of the bottom portion to become cloudy impairing the appearance of the container.

It is therefore an object of the present invention to provide a polyester container having excellent heat resistance and shock resistance and a method of its production.

Another object of the present invention is to provide a polyester container having excellent heat resistance and shock resistance despite the center of the bottom is formed thick, that is a portion remaining in the injection gate and a method of its production.

According to the present invention, there is provided a polyester container obtained by stretch-forming a preform of a thermoplastic polyester resin formed by injection forming wherein:

a central portion of a bottom wall is the remaining part of the gate at the time of injection forming, and is formed relatively thicker than a bottom wall portion surrounding the central portion; and the central portion of the bottom wall is substantially amorphous, and the bottom wall portion surrounding the central portion is oriented and crystallized.

In the polyester container of the present invention, it is desired that:

(1) the bottom wall other than the central portion has a crystallinity of not smaller than 15%;
(2) a flange is formed at an upper end of a body wall continuous to the bottom wall; and
(3) a bead portion protruding inward and a stepped portion are formed in an upper portion of the body wall, the stepped portion being positioned under the bead portion and protruding inward.

According to the present invention, there is, further, provided a method of producing a polyester container comprising:

forming a preform of a thermoplastic polyester resin by injection forming;

holding the remaining portion of the injection gate of the preform between a stretching rod and a cooling rod;

drawing in the axial direction by stretching the stretching rod and causing the cooling rod to move following the stretching rod and, further, blow-drawing by blowing a fluid;

bringing an outer surface of the stretch-formed body into contact with a surface of a heating metal mold that is maintained heated by blow-drawing except the portion to where the cooling rod is contacting, in order to form the formed body into the shape of a container; and heat-setting by heating by the contact with the surface of the heating metal mold except a portion to where the cooling rod is contacting.

In the above production method, it is desired that:

(4) after the heat-setting, a cooling core metal mold is inserted in the stretch-formed body formed in the shape of a container, and the stretch-formed body is shrunk back to the shape of the core metal mold, followed by cooling;
(5) the back surface of the flange formed on the preform is selectively heat-crystallized prior to holding the remaining portion of the injection gate of the preform between the stretching rod and the cooling rod;
(6) the preform is positioned upside down, and the back surface side of the flange is selectively heated so as to be heat-crystallized by holding the front surface side of the flange by using a cooling jig;

(7) the cooling jig has a ring-like support fitting and a core-support fitting positioned in the ring, the front surface side of the flange is held by the ring-like support fitting at the time of selectively heating the back surface side of the flange, and the inner surface of the stretch-formed portion of the preform surrounded by the flange is held by the core-support fitting;

(8) on the back surface side of the preform, a shielding plate that suppresses the conduction of heat is arranged near the boundary portion between the flange and the stretch-formed portion to selectively heat the back surface side of the flange;

(9) after the back surface side of the flange is selectively heated, the flange is clamped to stabilize the size of the flange; and

(10) a recessed portion and a stepped surface corresponding to the bead portion and to the annular stepped portion formed in the body wall of the container, are formed in the outer surface of the cooling core metal mold.

In the polyester container of the present invention, the center of bottom portion of the container that is the remaining portion of the injection gate is substantially amorphous while other portions are oriented and crystallized. Owing to the amorphous center of the bottom portion, flexibility is exhibited making it possible to enhance the shock resistance yet maintaining excellent heat resistance. That is, the polyester container of the present invention exhibits excellent heat resistance as well as excellent shock resistance despite it has the thick portion that is the remaining portion of the injection gate at the center of the bottom.

According to the method of producing the polyester container of the present invention, the stretch-forming (drawing in the axial direction and blow-drawing) is effected while holding the remaining portion of the injection gate (thick portion) of the preform between the stretching rod and the cooling rod. Here, the thick portion is not removed but is left and is rendered to be amorphous. Therefore, the thick portion does not have to be held by the above rods with a high pressure; i.e., the cooling rod moves following the stretching rod that stretches effectively alleviating such an inconvenience that a large load is exerted on the apparatus. Further, only the portion that becomes the center of the bottom portion with which the cooling rod is in contact is cooled by utilizing the cooling rod while other portions are heat-set by using the heated metal mold. Therefore, other portions are oriented and crystallized to improve the heat resistance while maintaining the center of the bottom portion of the container amorphous.

BEST MODE FOR CARRYING OUT THE INVENTION

A polyester container of the present invention and a method of its production will now be described in detail with reference to the accompanying drawings.

(Container)

Figure 1:
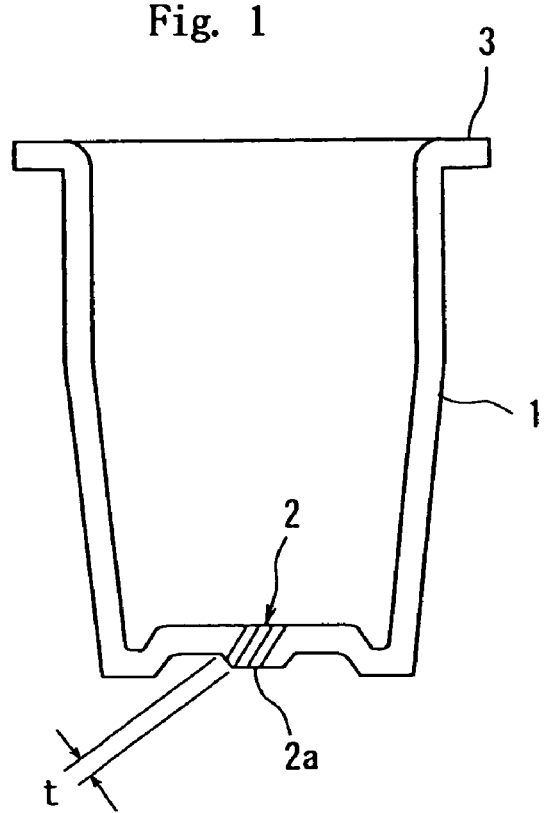
FIG. 1 is a side sectional view showing a representative shape of a polyester container of the present invention.

Referring to FIG. 1 showing a representative shape of the polyester container of the invention, the container as a whole is of the shape of a cup, has a body wall 1 and a bottom wall 2 closing the lower end of the body wall 1, the upper end of the body wall 1 being opened to form a mouth portion which is forming a flange 3 at an upper end of the body wall 1. That is, after the content such as a food or a beverage is contained in the container, the flange 3 is heat-sealed with a sealing foil (not shown) such as an aluminum foil, and the container is put to the vending. The bottom wall 2 may be formed flat as a whole. As shown in FIG. 1, however, it is desired that the bottom wall 2 is recessed to some extent from the lower end of the body wall 1 from the standpoint of stability when the container is placed and resistance against the deformation. Further, the container as a whole is transparent but the flange 3 is often opaque.

In the container of the invention as will be understood from FIG. 1, a thick portion 2a which is the remaining portion of gate stemming from the injection gate is formed at the center of the bottom wall 2. The thickness of the thick portion 2a is relatively greater than other portions of the bottom wall 2 and, usually, protrudes to a height t of about 0.1 to about 3.0 mm though it may vary depending upon the size of the container, use and stretching ratio at the time of stretch-forming that will be described later. The thick portion 2a is formed when a preform that will be described later is formed by injection forming.

The present invention has a feature in that the bottom wall 2 except the thick portion 2a therein, the body wall 1 and, as required, the flange 3 are oriented and crystallized, and are, further, heat-set, but the thick portion 2a present at the center of the bottom wall 2 remains substantially amorphous. The fact that the thick portion 2a at the center of the bottom wall 2 remains amorphous means that this portion has not been substantially stretched, has not been oriented or crystallized and, besides, has not been heat-set. That is, the thick portion 2a of the container of the invention has a crystallinity of smaller than 15% and, desirably, as very small as not larger than 5% as measured by the densitometry, and is substantially amorphous while other portions are oriented and crystallized. The bottom wall 2 except the thick portion 2a has a crystallinity of not smaller than 15% and, particularly, the body wall 1 has a crystallinity of not smaller than 35%. Thus, the thick portion 2a which remains substantially amorphous exhibits flexibility or elasticity specific to the amorphousness, providing a function for improving the shock resistance. As a result, the container of the invention exhibits excellent heat resistance and excellent shock resistance despite of having the thick portion 2a that stems from the remaining portion of the injection gate.

For instance, as will be obvious from the experimental results of Example and Comparative Example described later, the container of the invention (Example 1) having the amorphous thick portion 2a exhibits very excellent heat resistance and shock resistance yet maintaining transparency in the thick portion 2a. In the container (Comparative Example 1) having the thick portion 2a that is heat-fixed, on the other hand, spherulites are formed in the thick portion 2a. As a result, though the heat resistance is favorable, the shock resistance decreases conspicuously and, besides, the thick portion 2a is opaque.

In the present invention, the thermoplastic polyester resin that constitutes the above container is, particularly, a polyester resin that exhibits excellent transparency and shock resistance due to stretching and that can be effectively heat-set. Particularly preferably, there can be used a polyethylene terephthalate, a polypropylene terephthalate and a polyester comprising polylactic acid as a chief constituent component, that have glass transition points of not lower than room temperature and crystallinity. Particularly, it is desired to use a polyethylene terephthalate having ethylene terephthalate units of not less than 80 mol % and, particularly, not less than 90 mol % from the standpoint of economy, formability and properties of the formed body. The copolymerizable components when the above polyethylene terephthalate is used are, desirably, isophthalic acid, 2,6-naphthalenedicarboxylic acid, 1,4-butanediol and 1,4-cyclohexanedimethanol. As the thermoplastic polyester resin, the polyethylene terephthalate is most desired. Not being limited thereto only, there can be used polyethylene/butylene terephthalate, polyethylene terephthalate/2,6-naphthalate, polyethylene terephthalate/isophthalate, or a blend thereof with polybutylene terephthalate, polybutylene terephthalate/isophthalate, polyethylene-2,6-naphthalate, polybutylene terephthalate/adipate, polyethylene-2,6-naphthalate/isophthalate, or polybutylene terephthalate/adipate or two or more kinds thereof. It is desired that the polyester has an intrinsic viscosity [IV] of not smaller than 0.5 and, particularly, in a range of 0.6 to 1.5 as measured by using, as a solvent, a phenol/tetrachloroethane mixed solvent from the standpoint of formability of a preform, formability of a container, and mechanical properties and heat resistance of the container. The polyester may be blended with at least one of ethylene polymer, thermoplastic elastomer, polyacrylate or polycarbonate as a reforming resin component. It is desired that the reforming resin component is, usually, used in an amount of up to 60 parts by weight and, particularly preferably, in an amount of 3 to 20 parts by weight per 100 parts by weight of the polyester.

The thermoplastic polyester resin that constitutes the above container may be blended with known blending agents, such as antioxidant, heat stabilizer, ultraviolet ray absorber, antistatic agent, filler, lubricant and inorganic or organic coloring agent.

After produced, the cup-shaped containers shown in FIG. 1 are preserved or transported in a state of being stacked one upon the other. When stacked, however, the containers of the upper sides deeply fit into the containers of the lower sides due to their own weights and it becomes difficult to separate the stacked containers from each other. To alleviate the above inconvenience, it is desired that the body wall 1 of the container is formed in a shape as shown in FIG. 2.

Figure 2:
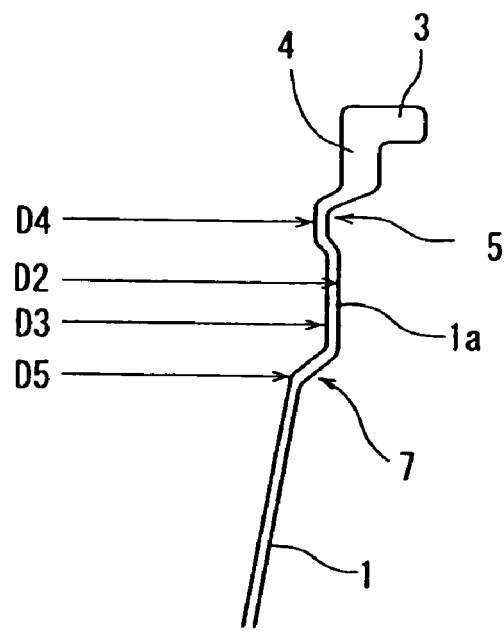
FIG. 2 is a side sectional view illustrating, on an enlarged scale, a portion of the shape of a body wall where a bead portion is formed in the polyester container of the present invention.
Figure 3:
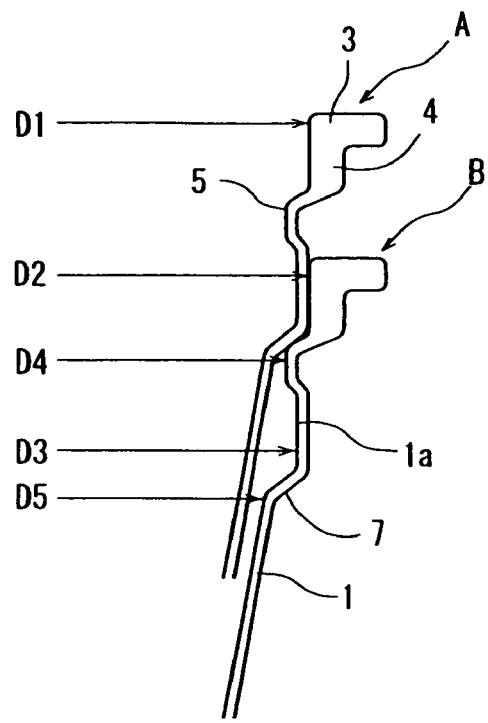
FIG. 3 is a side sectional view illustrating, on an enlarged scale, a portion of the state where the polyester containers having the body wall of FIG. 2 are stacked.

In FIG. 2, the upper end portion 4 (portion continuous to the flange 3) of the body wall 1 is a point from where the stretching starts and is formed relatively thick due to such a reason that the flange 3 (particularly, the back surface of the flange 3) has been heat-crystallized. A bead portion 5 is formed under the thick portion 4 and, further, an annular stepped portion 7 (hereinafter often referred to as stack portion) is formed protruding inward under the bead portion 5. Referring to FIG. 3, when the containers are stacked, the outer surface of the stack portion 7 of an upper container A comes in contact with the upper surface of the bead portion 5 of a lower container B to maintain the stacked state. This makes it possible to effectively alleviate such an inconvenience that the upper container A falls deeply into the lower container B, i.e., to effectively alleviate such an inconvenience it becomes difficult to separate the upper container A and the lower container B from each other.

Figure 4:
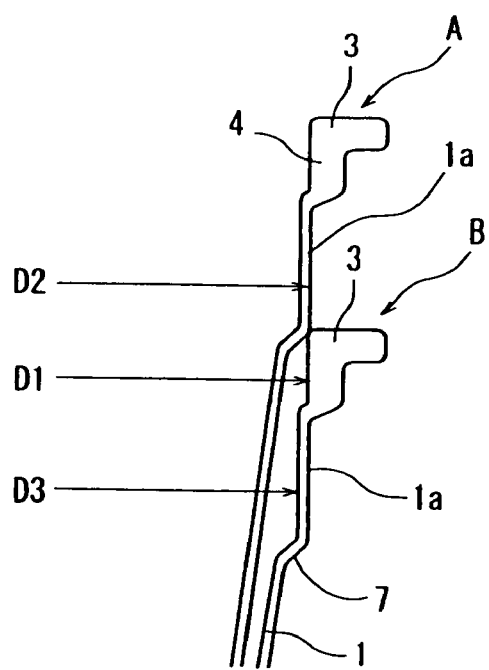
FIG. 4 is a side sectional view illustrating, on an enlarged scale, a portion of the state where the polyester containers having the body wall without bead portion are stacked.

If the bead portion 5 is not formed as shown in FIG. 4, the outer surface of the body wall 1a over the stack portion 7 of the upper container A comes into engagement with the upper end (container opening) of the lower container B to maintain the stacked state. In this case, therefore, the overlapping width d of the upper container A and the lower container B is expressed by the following formula, $$d = (\text{outer diameter } D2 \text{ of body wall } 1a - \text{inner diameter } D1 \text{ of container mouth portion})/2$$

which is very small. That is, the body wall 1 is usually formed being tilted from the upper end toward the inside. Therefore, the overlapping width d becomes a maximum when the body wall 1 is vertically falling down, the maximum width dmax being, $$d\max = (\text{outer diameter } D2 \text{ of body wall } 1a - \text{inner diameter } D3 \text{ of body wall } 1a)/2$$

which is merely equal to the thickness of the body wall 1a. When many containers are stacked one upon the other, therefore, the upper containers A deeply fall into the lower containers B due to their own weights making it difficult to separate them from each other.

When the bead portion 5 is formed as shown in FIG. 2, on the other hand, the overlapping width d of the upper container A and the lower container B in the stacked state shown in FIG. 3 is expressed by the following formula, $$d = (\text{outer diameter } D2 \text{ of body wall } 1a - \text{inner diameter } D4 \text{ of bead portion})/2$$

By protruding the bead portion 5 inward, therefore, the overlapping width d can be increased making it possible to stack the containers maintaining stability. In particular, when the container body wall 1 is formed by shrink back that will be described later, limitation is imposed on the inner diameter of the flange 3 (container mouth portion) or on the shape of the body wall 1a near the flange 3. Therefore, stabilization in the stacking by the formation of the bead portion 5 is very meaningful. It is, for instance, desired that the overlapping width d of the upper container A and the lower container B is set to be not smaller than 0.5 mm and, particularly, not smaller than 0.8 mm. It is therefore desired that the bead portion 5 is so formed that a difference (D3−D4) between the inner diameter D3 of the body wall 1a and the inner diameter D4 of the bead portion 5 is not smaller than 1.0 mm. Further, the inner diameter D5 of the stack portion 7 should be set to be smaller than the inner diameter D4 of the bead portion 5 so that the outer surface of the stack portion (annular stepped portion) 7 of the upper container A is stably held by the upper surface of the bead portion 5.

Here, the bead portion 5 may be so formed that the container is stacked without being tilted. Namely, the bead portion 5 may be formed like a ring over the whole circumference of the body wall 1, or a plurality of pad portions 5 may be locally and symmetrically formed on the body wall 1.

By forming the bead portion 5 as described above, the containers can be stacked one upon the other maintaining stability. There is, further, an additional advantage in that the bead portion 5 works as a reinforcing rib to improve the mechanical strength of the body wall 1.

(Production of the Container)

The polyester container of the present invention is produced by heating a preform of the shape of a sheet and of nearly a disk formed by injection-forming the above thermoplastic polyester resin at a predetermined heat-forming temperature and effecting the stretch-forming through steps shown in FIGS. 5(a) to 5(e).

The preform (designated at 10 in FIG. 5) is obtained in substantially an amorphous state, and the central portion thereof (designated at 10a in FIG. 5) is formed thick being corresponded to the center of the bottom wall 2. Namely, the thick portion is the remaining portion of the injection gate corresponding to the injection gate of the injection-forming machine.

It is desired that the temperature for heating the preform 10 at the time of stretch-forming is not lower than a glass transition temperature (Tg) of the thermoplastic polyester resin that constitutes the preform but is lower than a crystallization starting temperature (Tic) thereof. If the heating temperature is lower than the glass transition temperature (Tg), an excess of force is needed for the heat-forming at steps that will be described below. If the heating temperature is not lower than the crystallization starting temperature (Tic), on the other hand, spherulites are formed and the transparency tends to be impaired. The glass transition temperature (Tg) and the crystallization starting temperature (Tic) used in the specification are found from a DSC curve that is obtained by picking up about 10 mg of the formed body that is to be measured, holding the sample at 300° C. for 3 minutes in a nitrogen gas atmosphere, quickly cooling the sample down to room temperature, and elevating the temperature at a heating rate of 20° C. a minute by using a differential scanning calorimeter (DSC).

Step of Tightening the Mold [FIG. 5(a)]:

Referring to FIG. 5(a), first, the preform 10 heated at the above temperature is tightened on a forming metal mold (female metal mold) 14 by using an annular tightening member 12.

In FIG. 5(a), the circumferential edge portion 11 of the preform 10 held by the annular tightening member 12 and the forming metal mold 14 becomes a portion that corresponds to the flange 3 of the container.

A stretching rod 16 is extending through the annular tightening member 12, a communication hole is formed in the central portion of the forming metal mold 14, and a cooling rod 18 is extending through the communication hole. These rods are allowed to move up and down and, particularly, the cooling rod 18 moves following the stretching rod 16. The end surface of the cooling rod 18 is, usually, of nearly a size capable of coming in contact with the whole thick portion formed at the central portion 10a of the preform 10 while the end surface of the stretching rod 16 is larger than the end surface of the cooling rod 18.

Though not shown, the stretching rod 16 and the cooling rod 18 have gas flow passages formed therein in the axial direction thereof.

Prior to executing the above step, the circumferential edge portion 11 (corresponding to the flange 3 of the container of FIG. 1) of the preform 10 is preheated and is heat-crystallized to impart heat resistance thereto. The step of heat-crystallization will be described later.

Referring to FIG. 5(a), the circumferential edge portion 11 of the preform 10 is held by the forming metal mold 14 and by the annular tightening member 12. When the heat-crystallization has not been effected, the tightening pressure is desirably increased to pressurize with a pressure of about 4.5 to about 13 MPa. When tightened with such a high pressure, the circumferential edge portion 11 that is heated at higher than the glass transition temperature is stretched and its thickness decreases down to, for example, about one-third to one-half. Therefore, the circumferential edge portion 11 is oriented and crystallized by the flow of resin and heat resistance is imparted thereto.

To accelerate the orientation and crystallization (fluidization of resin) by the pressurized tightening, it is desired to apply a suitable lubricant such as silicone oil to the upper surface and lower surface of the circumferential edge portion 11 of the preform 10, or to the lower surface of the annular tightening member 12 or to the upper surface of the forming metal mold 14.

Step of Stretching [FIG. 5(b)]:

Stretching is effected as shown in FIG. 5(b) following the step of tightening the mold for the preform 10. That is, in the step of stretching, the stretching rod 16 is stretched, the central portion of the preform 10 (corresponding to the thick portion 2a at the center of bottom of the container of FIG. 1) is held between the stretching rod 16 and the cooling rod 18, to thereby effect the stretching in the axial direction by using the stretching rod 16 and the blow-stretching.

In FIG. 5(b), the stretching is effected in the axial direction by stretching the stretching rod 16 in the axial direction. Here, the cooling rod 18 moves following the stretching rod 16 that stretches. That is, no excess of pressure acts on the portion (central portion 10a of the preform 10) held by the rods 16 and 18. Besides, this portion is cooled by the cooling rod 18. Accordingly, fluidization of the resin is effectively suppressed in this portion. As a result, the orientation and crystallization are suppressed at the central portion 10a of the preform 10, i.e., at the portion corresponding to the thick portion 2a at the center of bottom of the container. Therefore, the amorphous state is maintained at the portion corresponding to the thick portion 2a at the center of bottom of the container.

After the stretching in the axial direction, the cooling rod 18 retreats to a position recessed from the cavity surface 14a of the forming metal mold 14 by the thickness of the thick portion. Thereafter, the compressed air or the like is blown out from the gas flow passage formed in the stretching rod 16 to effect the blow-stretching. Therefore, the preform 10 is formed in the shape of the cavity surface 14a of the forming metal mold 14 while leaving the thick portion at the central portion 10a of the preform 10. The portions other than the central portion 10a are oriented and crystallized to enhance the heat resistance.

Step of Heat-Setting [FIG. 5(c)]:

Next, the stretch-formed body 20 obtained above is heat-set. The heat-setting is effected by bringing the stretch-formed body 20 into contact with the cavity surface 14a of the forming metal mold 14 that is heated to the heat-setting temperature in order to accelerate the crystallization while relaxing the distortion caused by forming. This further contributes to improve the heat resistance and the mechanical strength. It is desired that the heat-setting temperature is higher than a crystallization initiating temperature (Tic) of the thermoplastic polyester forming the preform 10 (stretch-formed body 20) but is lower than a melting point (Tm) thereof and, particularly, is not higher than the melting point (Tm)−10° C. (usually, about 180° C.). If the heat-setting temperature is not lower than the melting point (Tm), it is probable that the stretch-formed body 20 melt-adheres to the forming metal mold 14. If the heat-setting temperature is lower than the crystallization initiating temperature (Tic), the crystallization is not sufficient, distortion due to forming is not sufficiently relaxed, and heat resistance and strength are not obtained. Further, the heat-fixing time is, usually, about 0.5 to about 5 seconds though it may vary depending upon the level of heat resistance that is desired.

In effecting the heat-setting according to the present invention, the central portion 20a of the stretch-formed body 20 (corresponds to the central portion 10a of the preform 10) is not in contact with the forming metal mold 14 but is in contact with the cooling rod 18 and is cooled. Therefore, no heat-setting is effected for the thickly formed central portion 20a that is the remaining portion of the injection gate. As a result, the central portion 20a is maintained in the amorphous state but other portions (e.g., bottom portion excluding the central portion 20a, body portion and flange) are heat-fixed. That is, if the thickly formed central portion 20a is heated at the heat-setting temperature, spherulites form causing a decrease in the shock resistance and impairing the transparency. By maintaining the thick central portion 20a amorphous, however, the transparency is maintained, and flexibility and elasticity are imparted owing to the amorphous property effectively alleviating a decrease in the shock resistance.

In the present invention, the forming metal mold 14 can be easily heated to the heat-fixing temperature by providing heating means such as a heater in the forming metal mold 14. The above heating may be effected after the stretch-forming. Usually, however, the forming metal mold 14 is heated at the heat-setting temperature in advance and, in this state, the above step of tightening and the step of stretching are conducted, and the heating is discontinued after the heat-setting has been finished.

The cooling rod 18 is cooled by a suitable coolant and its temperature is so set that at least the central portion 20a of the stretch-formed body 20 is lower than the heat-setting temperature (particularly, lower than the glass transition temperature in the step of stretching). Here, however, since the forming metal mold 14 is heated, attention should be so given that the central portion of the stretch-formed body 20 or of the preform 10 is not elevated to be higher than the heat-setting temperature or the glass transition temperature by the radiation of heat.

Figure 5:
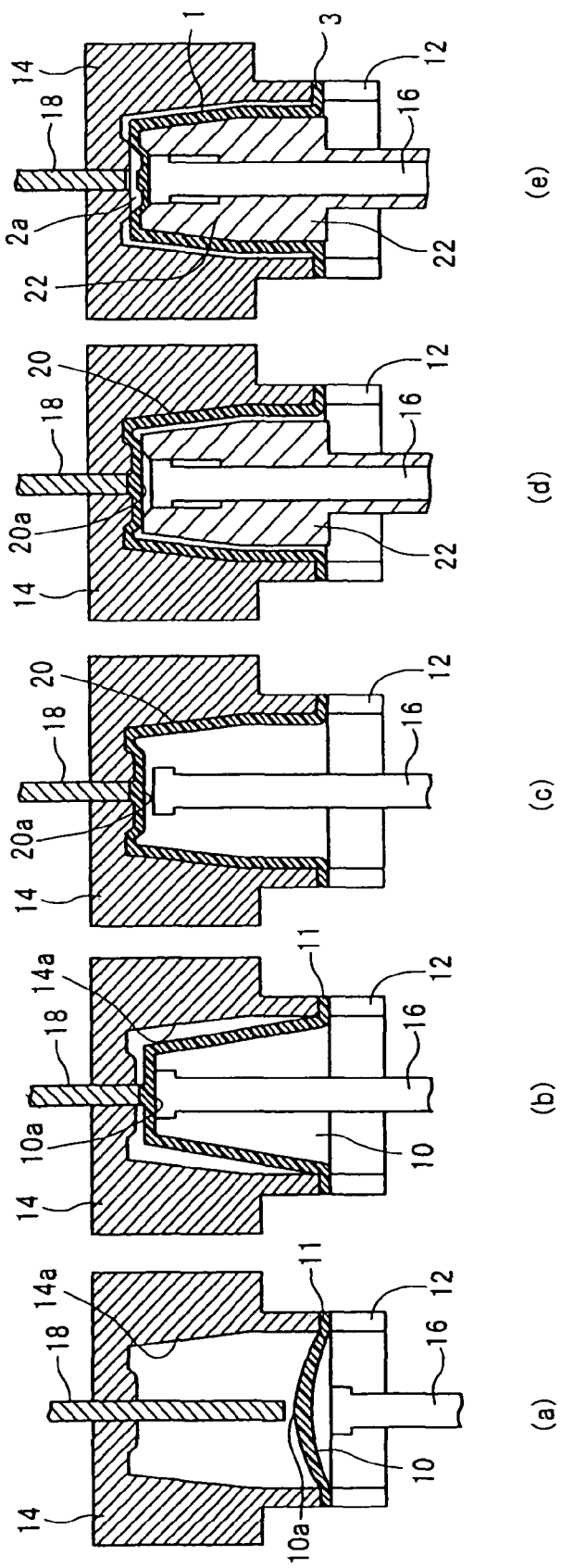
FIG. 5 is a view of steps illustrating a process for producing the container of FIG. 1.

Step of Inserting the Core [FIG. 5(*d*)] and Step of Shrink Back [FIG. 5(*e*)]:

In the present invention, after the above heat-setting, a cooling core metal mold 22 is inserted through an annular space of the annular tightening member 12 [FIG. 5(*d*)]. The shape of outer surface of the cooling core metal mold 22 corresponds to the shape of the container shown in FIG. 1. Further, when the bead portion 5 and the stack portion 7 (annular stepped portion) are formed in the upper part of the body wall 1 as shown in FIG. 2, a recessed portion forming the bead portion and a stepped surface are formed in the outer surface of the cooling core metal mold 22 at corresponding positions.

After the core metal mold 22 is inserted, a compressed gas such as the compressed air is blown from the gas flow passage of the cooling rod 18. As required, further, the gas is sucked under a reduced pressure through the gas flow passage of the stretching rod 16 to effect the shrink back [FIG. 5(*e*)]. Due to the shrink back, the stretch-formed body 20 is formed in the shape of the final container and is quickly cooled. By taking out the stretch-formed body 20, a container having the final shape is obtained as shown in FIG. 1 or 2.

It is also possible to obtain the stretch-formed body 20 in the final shape of the container without conducting either the step of inserting the core or the step of shrink back. In this case, however, the cooling requires an extended period of time and the productivity very decreases. It is therefore desired to effect the step of inserting the core and the step of shrink back as described above in order to shorten the cooling time and to very increase the productivity.

Thus, the above-mentioned method makes it possible to obtain the container as shown in FIG. 1 or 2. In this container, the thick portion 2a formed at the central portion of the bottom portion 2 is substantially amorphous while other portions are oriented, crystallized and are heat-fixed. However, the thick portion 2a at the center of the bottom wall 2 is not oriented, crystallized or heat-set. Therefore, excellent heat resistance and shock resistance are exhibited. Step of heat-crystallizing the flange:

As described earlier, the preform 10 formed by injection-forming is heat-crystallized for its circumferential edge portion 11 (corresponds to the flange 3) to enhance its heat resistance prior to effecting the forming through the above step. If the circumferential edge portion (hereinafter called flange) 11 is wholly heat-crystallized, however, it becomes difficult to effect the heat-sealing. Therefore, the back surface of the flange 11 is selectively heat-crystallized by being selectively heated to maintain, in the amorphous state, the surface of the flange 11 to which various lid members will be fixed by heat-sealing.

Figure 6:
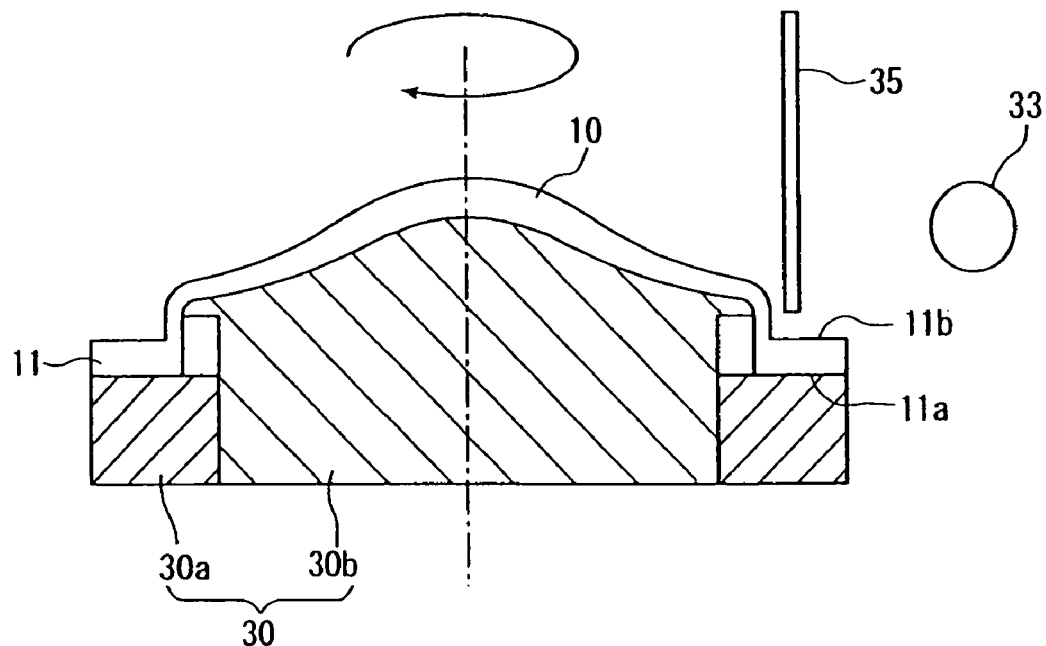
FIG. 6 is a view illustrating a step of selectively heat-crystallizing a flange of a preform.

The selective heat-crystallization is conducted by holding the preform 10 upside down on a cooling jig 30 as shown in FIG. 6. FIG. 6 and the succeeding drawings do not show the thick portion 20a of the preform 10 that stems from the remaining portion of the gate formed by the injection-forming.

In FIG. 6, the cooling jig 30 has a ring-like support fitting 30a and a core-support fitting 30b which are formed by using a metal material such as a stainless steel, aluminum or a steel, and are, as required, so constituted that a coolant such as cooling water or the like circulates therein. Or, the jig 30 has heat-radiating fins formed thereon. Besides, the ring-like support fitting 30a and the core support fitting 30b are integrally coupled together so as to rotate together. The ring-like support fitting 30a is supporting the surface 11a of flange 11 of the preform 10 and the core support fitting 30b is supporting the inner surface of the stretch-formed portion of the preform 10. The stretch-formed portion is a central portion of the preform 10 surrounded by the flange 11, and is the portion that is stretch-formed as described above. That is, in conducting the heat-treatment as described below, the surface 11a of flange 11 of the preform 10 and the stretch-formed portion are effectively suppressed by these members 30a and 30b from being heated at temperatures higher than the heat-crystallization temperature.

Further, a heat source 33 is provided on the side of the back surface 11b of flange 11 of the preform 10 to selectively heat the back surface 11b of flange 11, to improve the strength and heat resistance of the flange 11 by the heat-crystallization, and to maintain the surface 11a of flange 11 in the amorphous state. Further, the stretch-formed portion of the preform 10 is prevented from being heat-crystallized, so that no inconvenience occurs in the stretch-forming that is caused by an increase in the softening point or the like.

In the present invention, it should be understood that the heat-crystallization is effectively executed by the selective heating since the preform 10 is held upside down. When the heating is effected from the side of the back surface 11b of flange 11 by holding the preform 10 upright, the flange 11 is softened by heating and a gap forms between the surface 11a of the flange 11 and the ring-like support fitting 30a for cooling. Therefore, the surface 11a of the flange is not effectively cooled and this portion, too, is heat-crystallized (if the surface 11a of the flange is heat-crystallized, it becomes difficult to fix the lid member or the like thereto by heat-sealing). It can be further contrived to effectively cool the surface 11a of the flange by pushing the ring-like support fitting 30a onto the surface 11a of the flange. In this case, however, since the flange 11 is pushed at the time of heating, an inconvenience occurs such as the flange 11 itself undergoes the heat-deformation. Upon heating the back surface 11b of the flange by holding the preform 10 upside down, the back surface 11b of the flange can be selectively heat-crystallized without causing the above inconvenience, and the surface 11a of the flange can be maintained in the amorphous state.

As the heat source 33, there can be used a carbonic acid gas laser, a near infrared-ray heater, a far infrared-ray heater, or a hot air heater. For example, the heating is effected by the heat source 33 of which the position has been fixed while rotating the cooling jig 30. In this case, if the carbonic acid gas laser is used, the portion irradiated with laser can be easily adjusted offering an advantage of selectively heating the back surface 11b of the flange 11. When other means is used as the heat source 33, it is not easy to adjust the heated portion. As shown, for example, in FIG. 6, therefore, it is desired to dispose the heat source 33 on the outer side over the back surface 11b of the flange and, at the same time, to fix a shielding member 35 for shutting heat near the root portion of the flange 11 (near the boundary portion between the flange 11 and the stretch-formed portion). The shielding member 35 is formed by using a metal having high heat conductivity. Provision of the shielding member 35 effectively prevents the stretch-formed portion of the preform 10 from being heated, and enables the back surface 11b of the flange 11 to be efficiently and selectively heated.

In FIG. 6, the core support fitting 30b for cooling is intimately adhered onto the whole inner surface of the stretch-formed portion of the preform 10 and offers advantages of reducing the load exerted on the surface 11a of the flange and effectively preventing the flange 11 from being deformed by heating. The whole inner surface of the stretch-formed portion of the preform 10 does not have to be closely contacted to the core support fitting 30b unless the stretch-formed portion is heated to be higher than the heat-crystallization temperature. For instance, a suitable space may be formed between the central portion 20a of the stretch-formed portion and the core support fitting 30b.

Figure 7:
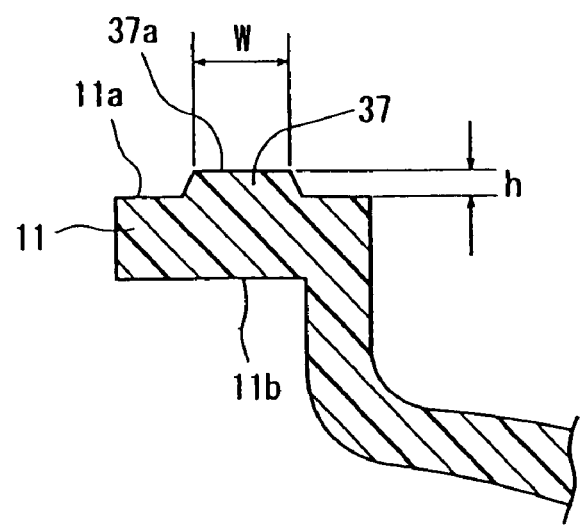
FIG. 7 is a view illustrating a preferred shape of the flange of the preform.

In order to reliably maintain amorphous the surface 11a of the flange in the above step of selective heat-crystallization, it is desired to provide the surface 11a of flange of the preform 10 with an annular protuberance 37 as shown in FIG. 7. As will be obvious from FIG. 7, the annular protuberance 37 has a substantially flat surface 37a at the upper end. If the selective heat-crystallization is effected by providing the above annular protuberance 37, it is allowed to reliably suppress the heat-crystallization in the flat surface 37a of the annular protuberance 37 and the lid member can be easily fixed to the above portion by heat-sealing. Generally speaking, the height h of the annular protuberance 37 is about 0.1 to about 2 mm. From the standpoint of maintaining a sufficient width of heat-sealing, it is desired that the width w of flat surface 37a of the annular protuberance 37 is about 0.5 to about 3.0 mm. When the flange 11 forming the annular protuberance 37 is to be selectively heat-crystallized, it is desired that the flat surface 37a only of the annular protuberance 37a is brought into contact with the annular support fitting 30a for cooling but other portions of the flange surface 11a are floating from the standpoint of conducting the efficient cooling.

Figure 8:
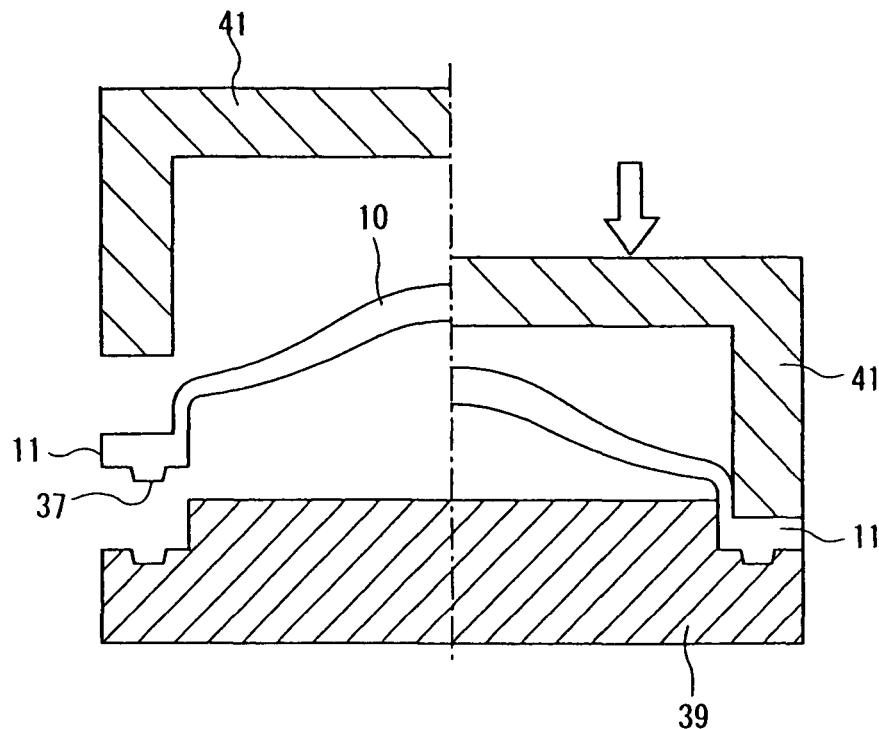
FIG. 8 is a view illustrating means for stabilizing the size of the flange conducted for the preform after the heating for the selective heat-crystallization of FIG. 6.
Figure 9:
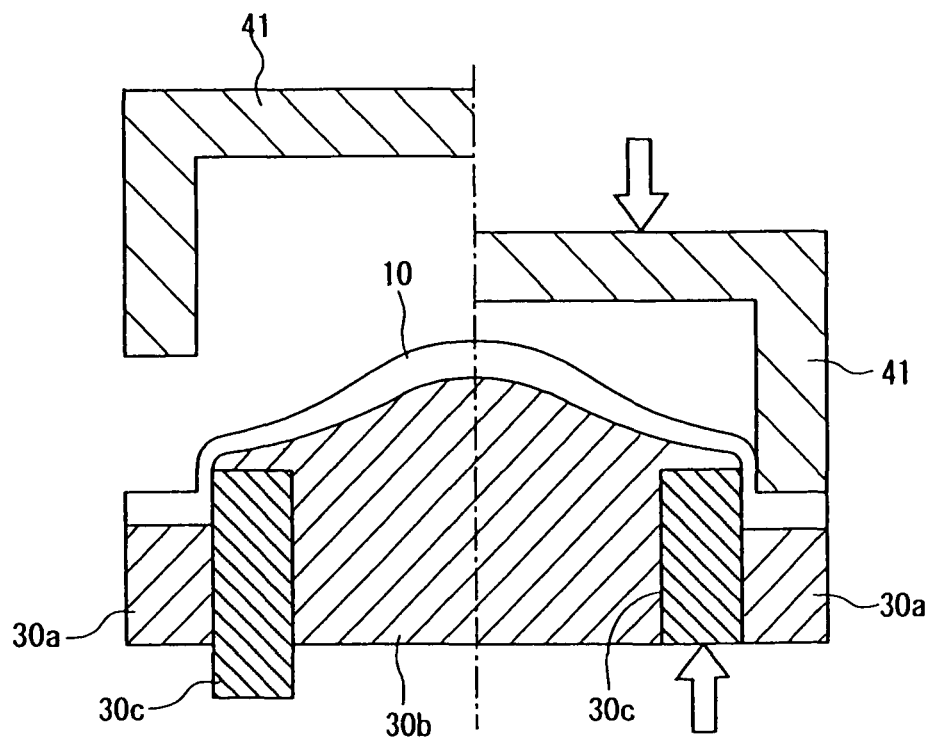
FIG. 9 is a view illustrating means for stabilizing the size different from that of FIG. 8.

Further, when the back surface 11b of the flange 11 is selectively heated as described above, deformation such as shrinking often occurs due to the heat-crystallization. To obtain the flange 11 of the desired size and shape even after deformed, the flange 11 is held from the back surface thereof by a cooling upper mold 41 while slightly broadening the mouth diameter of the flange 11 by using a cooling lower mold 39 as shown in FIG. 8 after the above selective heating while the flange 11 is still in a softened state, and the flange 11 is tightened with a suitable pressure and is cooled and fixed to a suitable size. As shown in FIG. 9, further, an annular cooling lower mold 30c for limiting the mouth diameter is provided so as to slide between the annular support fitting 30a and the core support fitting 30b. Therefore, the annular support fitting 30a for cooling can be utilized as the cooling lower mold 39 that is shown in FIG. 8. Here, after the selective heating has been finished, the annular cooling lower mold 30c for limiting the mouth diameter is elevated and is inserted in the mouth of the flange 11 and, at the same time, the cooling upper mold 41 is lowered to tighten the flange 11 relative to the annular support fitting 30a.

The preform 10 with the back surface 11b of the flange 11 being selectively heat-crystallized and with the surface 11a of the flange 11 being maintained amorphous, is subjected to the above step of stretch-forming and is formed into a container.

EXAMPLES

Excellent effects of the present invention will now be described by way of the following Examples and Comparative Examples.

[Densitometry]

The crystallinity was found by the densitometry of the following formula.

$$\text{Crystallinity } \chi c = \{[\rho c \times (\rho - \rho a)]/[\rho \times (\rho c - \rho a)]\} \times 100$$

$\rho$: measured density (g/cm$^3$)

$\rho a$: amorphous density (1.335 g/cm$^3$)

$\rho c$: crystalline density (1.455 g/cm$^3$)

The density was measured by using an n-heptane-carbon tetrachloride type density-gradient tube (manufactured by Ikeda Rika Co.) under a condition of 20° C.

Properties of the containers were evaluated in a manner as described below.

[Heat Resistance]

Empty containers were preserved in an oven heated at 105° C. for 4 minutes and 10 seconds, and ratios of changes of the full-filled contents were measured and evaluated before and after the preservation. The ratios of changes of not larger than 2% were evaluated to be ○.

[Shock Resistance]

The containers were each filled with 200 ml of water and were sealed. Thereafter, the containers were fallen from a height of 80 cm with their bottoms facing downward. The containers were repetitively fallen 5 times. Thereafter, the bottom portions were checked for their deformation by eyes and were evaluated to be ○ when there was no crack.

[Transparency of Bottom Portion]

The centers of the bottom portions were measured for their transparency (haze) by using a hazeometer manufactured by Suga Shikenki Co. The centers of the bottoms were evaluated to be ○ when the haze was not higher than 10%.

Example 1

A polyethylene terephthalate resin having an intrinsic viscosity of 0.8 dl/g (SA135 manufactured by Mitsui Kagaku Co., containing 2 mol % of isophthalic acid) was fed to an injection-forming machine (NN75JS manufactured by Niigata Tekkojo Co.), and was injection-formed under the conditions of an injection temperature of 275 to 300° C. and an injection pressure of 10 Kg/cm² to obtain 15.6 g of a substantially amorphous preform of a single layer.

The flange portion of the preform was heated up to 180° C. and was heat-crystallized by the irradiation by using a near infrared-ray heater.

The preform was heated at 95° C. which was higher than the glass transition temperature thereof, and was formed according to a process of FIGS. 5(a) to 5(e) to obtain a cup-like container with a flange.

Here, the forming metal mold was maintained at a temperature of 180° C. while the cooling rod and the cooling core metal mold were maintained at 30° C.

Table 1 shows the sizes of the tools, measured results of the crystallinity and evaluated results of the properties.

The central portion of the bottom portion was amorphous and the bottom portion surrounding the central portion was oriented and crystallized exhibiting sufficiently practicable properties concerning both heat resistance and shock resistance.

Comparative Example 1

A cup-like container with a flange was obtained under the same conditions as those of Example but without using the cooling rod in the process of FIGS. 5(a) to 5(e).

Table 1 shows the sizes of the tools, measured results of the crystallinity and evaluated results of the properties.

Spherulites were formed in the central portion of the bottom portion while the bottom portion surrounding the central portion was oriented and crystallized exhibiting excellent heat resistance. However, the shock resistance was not of a practicable level.

The invention claimed is:

1. A polyester container obtained by stretch-forming a preform of a thermoplastic polyester resin formed by injection forming wherein:
   the polyester container includes a bottom wall and a body wall connected to the bottom wall;
   the bottom wall consists of a central portion and a surrounding portion adjacent to and surrounding the central portion;
   the central portion of the bottom wall of the container is formed relatively thicker than a bottom wall portion surrounding the central portion, the central portion corresponding to a gate area of an injection gate used in the injection forming of the preform;
   the central portion of the bottom wall is substantially amorphous and has a crystallinity less than or equal to 5%; and
   the bottom wall portion surrounding the central portion is oriented and crystallized, the bottom wall includes a portion at a distance of 10 mm from the center of the central portion of the bottom wall having a crystallinity greater than or equal to 15%, and the bottom wall includes a portion at a distance of 6 mm from the center of the central portion of the bottom wall having a crystallinity less than or equal to 5%.

2. The polyester container according to claim 1, wherein a flange is formed at an upper end of the body wall.

3. The polyester container according to claim 2, wherein a bead portion protruding inward and a stepped portion are formed in an upper portion of the body wall, the stepped portion being positioned under the bead portion and protruding inward.

4. The polyester container according to claim 1, wherein the crystallinity, $X_c$, is defined by the equation $X_c = p_c(p-p_a)/p(p_c-p_a)$, wherein p is the measured density in grams per cubic centimeters (g/cm³), $p_a$ is the amorphous density of 1.335 g/cm³, and $p_c$ is the crystalline density of 1.455 g/cm³.

5. A method of producing a polyester container obtained by stretch-forming a preform of a thermoplastic polyester resin formed by injection forming wherein:
   the polyester container includes a bottom wall and a body wall connected to the bottom wall;

TABLE 1

| | Item | | | Example 1 | Comp. Ex. 1 |
|---|---|---|---|---|---|
| Sizes of tools | Stretching rod | End diameter | mm | 30.0 | ← |
| | | Temp. | ° C. | 30 | ← |
| | Forming metal mold | Temp. | ° C. | 180 | ← |
| | Cooling rod | End diameter | mm | 12.0 | ← |
| | | Temp. | ° C. | 30 | ← |
| | Cooling core metal mold | Outermost diameter | mm | 61.5 | ← |
| | | Length of forming portion | mm | 101.0 | ← |
| | | Temp. | ° C. | 30 | ← |
| Measured results of crystallinity | Center of bottom | | % | 1.9 | 39.7 |
| | Bottom surrounding the central portion (points 10 mm away from the center) | | | 39.1 | 39.9 |
| | Center of body portion | | | 42.2 | 36.5 |
| Evaluation of properties | Heat resistance | Change of volume when dry-heated | 2% or less | ○ | ○ |
| | Shock resistance | Upright falling test | Na crack | ○ | X |
| | Transparency of bottom portion | HAZE | 10% or less | ○ | X | the bottom wall consists of a central portion and a surrounding portion adjacent to and surrounding the central portion;

the central portion of the bottom wall of the container is formed relatively thicker than a bottom wall portion surrounding the central portion, the central portion corresponding to the area of an injection gate used in the injection forming of the preform;

the central portion of the bottom wall is substantially amorphous and has a crystallinity less than or equal to 5%; and the bottom wall portion surrounding the central portion is oriented and crystallized, the bottom wall includes a portion at a distance of 10 mm from the center of the central portion of the bottom wall having a crystallinity greater than or equal to 15%, and the bottom wall includes a portion at a distance of 6 mm from the center of the central portion of the bottom wall having a crystallinity less than or equal to 5%, the method comprising:

forming a preform of a thermoplastic polyester resin having a thick central portion by injection forming;

holding the thick portion of the preform between a stretching rod and a cooling rod;

drawing in the axial direction by stretching the stretching rod and causing the cooling rod to move following the stretching rod and, further, blow-drawing by blowing a fluid;

bringing an outer surface of the stretch-formed body into contact with a surface of a heating metal mold that is maintained heated by blow-drawing except the portion to where the cooling rod is contacting, in order to form the formed body into the shape of a container; and heat-setting by heating by the contact with the surface of the heating metal mold except a portion to where the cooling rod is contacting.

6. The production method according to claim 5, wherein after the heat-setting, a cooling core metal mold is inserted in the stretch-formed body formed in the shape of a container, and the stretch-formed body is shrunk back to the shape of the core metal mold, followed by cooling.

7. The production method according to claim 6, wherein a recessed portion and a stepped surface corresponding to the bead portion and to the annular stepped portion formed in the body wall of the container, are formed in the outer surface of the cooling core metal mold.

8. The production method according to claim 5, wherein a back surface of a flange formed on the preform is selectively heat-crystallized prior to holding the remaining portion of the injection gate of the preform between the stretching rod and the cooling rod.

9. The production method according to claim 8, wherein the preform is positioned upside down, and the back surface side of the flange is selectively heated so as to be heat-crystallized by holding the front surface side of the flange by using a cooling jig.

10. The production method according to claim 9, wherein the cooling jig has a ring-like support fitting and a core-support fitting positioned in the ring, the front surface side of the flange is held by the ring-like support fitting at the time of selectively heating the back surface side of the flange, and an inner surface of the stretch-formed portion of the preform surrounded by the flange is held by the core-support fitting.

11. The production method according to claim 10, wherein on the back surface side of the preform, a shielding plate that suppresses the conduction of heat is arranged near a boundary portion between the flange and the stretch-formed portion to selectively heat the back surface side of the flange.

12. The production method according to claim 5, wherein after the back surface side of the flange is selectively heated, the flange is clamped to stabilize the size of the flange.

* * * * *